(12) United States Patent
Zeiss

(10) Patent No.: US 6,411,525 B1
(45) Date of Patent: Jun. 25, 2002

(54) CEILING MOUNTED OVERHEAD STORAGE UNIT

(75) Inventor: John Zeiss, Stamford, CT (US)

(73) Assignee: Zeiss Storage Systems, Inc., Stamford, CT (US)

( * ) Notice: Subject to any disclaimer, the term of this patent is extended or adjusted under 35 U.S.C. 154(b) by 0 days.

(21) Appl. No.: 09/592,835

(22) Filed: Jun. 13, 2000

Related U.S. Application Data

(63) Continuation of application No. 09/126,792, filed on Jul. 31, 1998, now Pat. No. 6,088,239.

(51) Int. Cl.$^7$ ................................................ B64D 11/00
(52) U.S. Cl. ................ 361/809; 244/118.1; 312/223.6; 312/248
(58) Field of Search .............................. 312/223.6, 245, 312/246, 248; 244/118.1, 118.5; 439/620; 174/50, 58; 361/807, 809, 724–727, 600, 610, 622

(56) References Cited

U.S. PATENT DOCUMENTS

| | | | | |
|---|---|---|---|---|
| 5,219,443 A | * | 6/1993 | Stoerk et al. | 312/223.6 |
| 5,441,218 A | * | 8/1995 | Mueller et al. | 244/118.1 |
| 5,568,362 A | * | 10/1996 | Hansson | 361/736 |
| 5,716,027 A | * | 2/1998 | Hart et al. | 244/118.1 |
| 5,788,349 A | * | 8/1998 | DeMaine et al. | 312/223.6 |
| 5,796,585 A | * | 8/1998 | Sugiyama et al. | |
| 5,988,565 A | * | 11/1999 | Thomas et al. | 244/118.1 |
| 6,088,239 A | * | 7/2000 | Zeiss | 361/809 |

\* cited by examiner

*Primary Examiner*—Gerald Tolin
(74) *Attorney, Agent, or Firm*—Kenyon & Kenyon

(57) ABSTRACT

Overhead storage device adapted to be easily and inexpensively flush mounted on a variety of ceilings with little or no modification to the ceiling. The device is hingedly connected to a pan portion suspended from a ceiling and is selectively moveable from a first closed position against the ceiling to a second open position away from the ceiling.

9 Claims, 18 Drawing Sheets

CEILING MOUNTED OVERHEAD STORAGE UNIT

This application is a continuation of prior application Ser. No. 09/126,792 filed Jul. 31, 1998, now U.S. Pat. No. 6,088,239.

FIELD OF THE INVENTION

This invention relates generally to storage devices and more particularly to a ceiling mounted overhead storage device that may be quickly and easily attached directly to, or within, a variety of ceiling systems.

BACKGROUND OF THE INVENTION

Overhead storage systems are well known in the art. One shortcoming of conventional overhead storage devices is that they are often expensive and complicated to manufacture. Another shortcoming of conventional devices is that they are often difficult and time consuming to install. Yet another shortcoming of conventional overhead storage systems is that their installation often requires that a portion of the ceiling be removed or modified to permit installation of the device. Still another shortcoming of conventional overhead storage devices is that they often lack the rigidity and structural strength to permit the safe and rapid storage and retrieval of heavy objects.

Thus, there is a need for an overhead storage device that is inexpensive to manufacture and that can be easily and quickly installed directly to, or within, a variety of ceiling systems to permit the safe and rapid overhead storage and retrieval of even very heavy objects.

OBJECTS AND SUMMARY OF THE INVENTION

It is an object of this invention to provide an overhead storage device that is inexpensive to manufacture and easy to install.

It is another object of this invention to provide an overhead storage device that may be quickly and easily installed on, or within, a wide variety of different ceiling systems without requiring modification or removal of a portion of the ceiling.

It is still another object of this invention to provide an overhead storage device that is lightweight, decorative, and possesses improved strength and rigidity to permit heavy objects to be safely and rapidly stored overhead.

It is yet another object of this invention to provide a ceiling mounted storage device, comprising a storage bin having a closed bottom end and an open top end defining a storage compartment and a reinforcing ring engagement lip projecting from the first end of the storage bin. A reinforcing ring having a first channel and a second channel is provided. The first channel is sized and adapted to engage and retain the engagement lip and the second channel is sized and adapted to engage and retain the second portion of a latch assembly. The second channel is also adapted to engage and retain a reinforcing ring securing member. A pan portion having a first major surface and a second major surface is provided with a means for securing the pan portion to the ceiling. A reinforcing plate is disposed on the first major surface of the pan portion. A hinge hingedly connects the pan portion and the storage bin and is adapted to permit the storage bin to be selectively moveable in a first direction towards the pan portion to a first closed position and moveable in a second direction away from the pan portion to a second open position. A latch means assembly comprising a first portion and a second portion is provided with the first and second portions cooperatively disposed to permit the bin to be selectively secured in the first position.

DETAILED DESCRIPTION OF THE INVENTION

Figure 1:
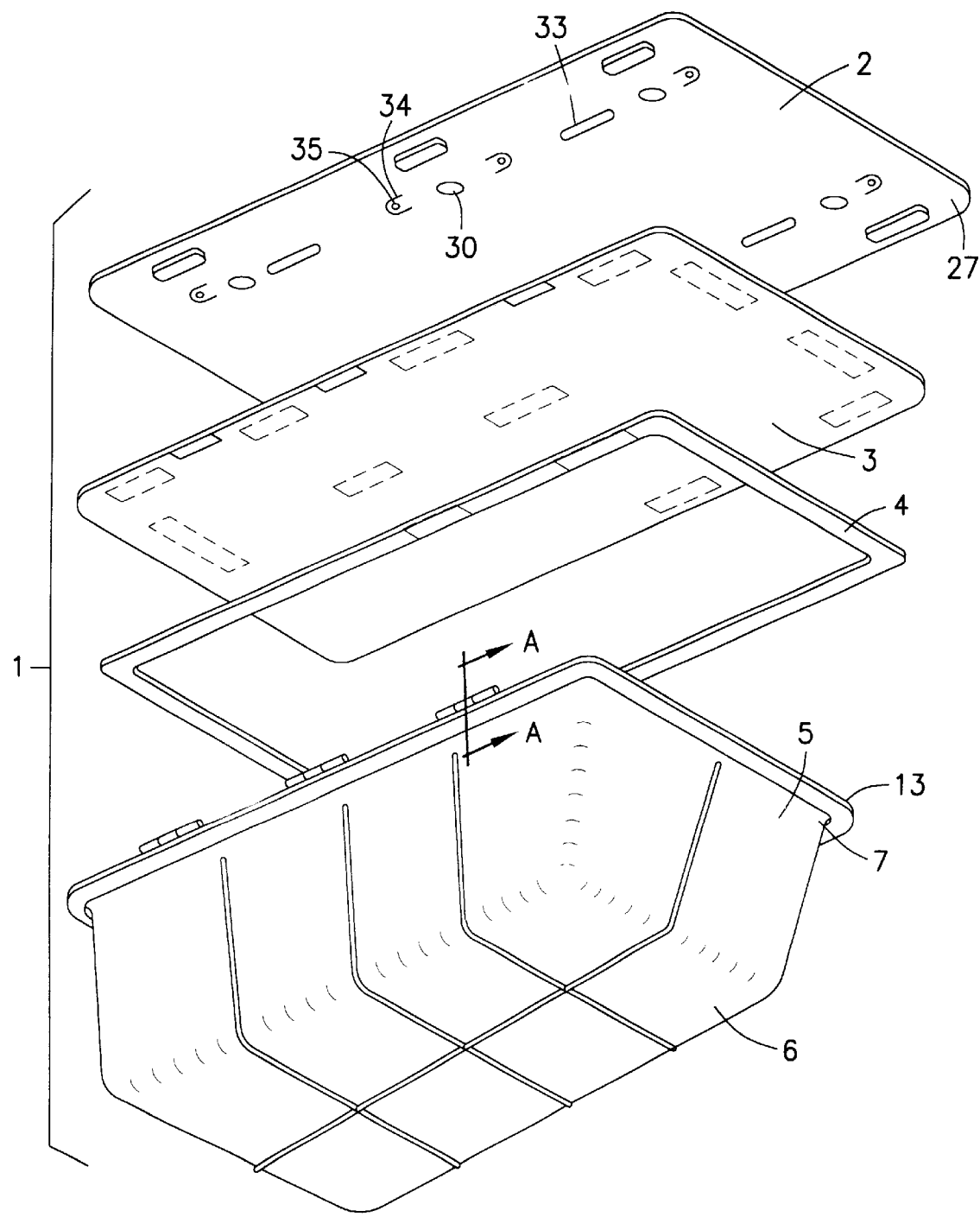
FIG. 1 is an exploded view showing the components of one embodiment of an overhead storage system constructed in accordance with the invention.
Figure 2:
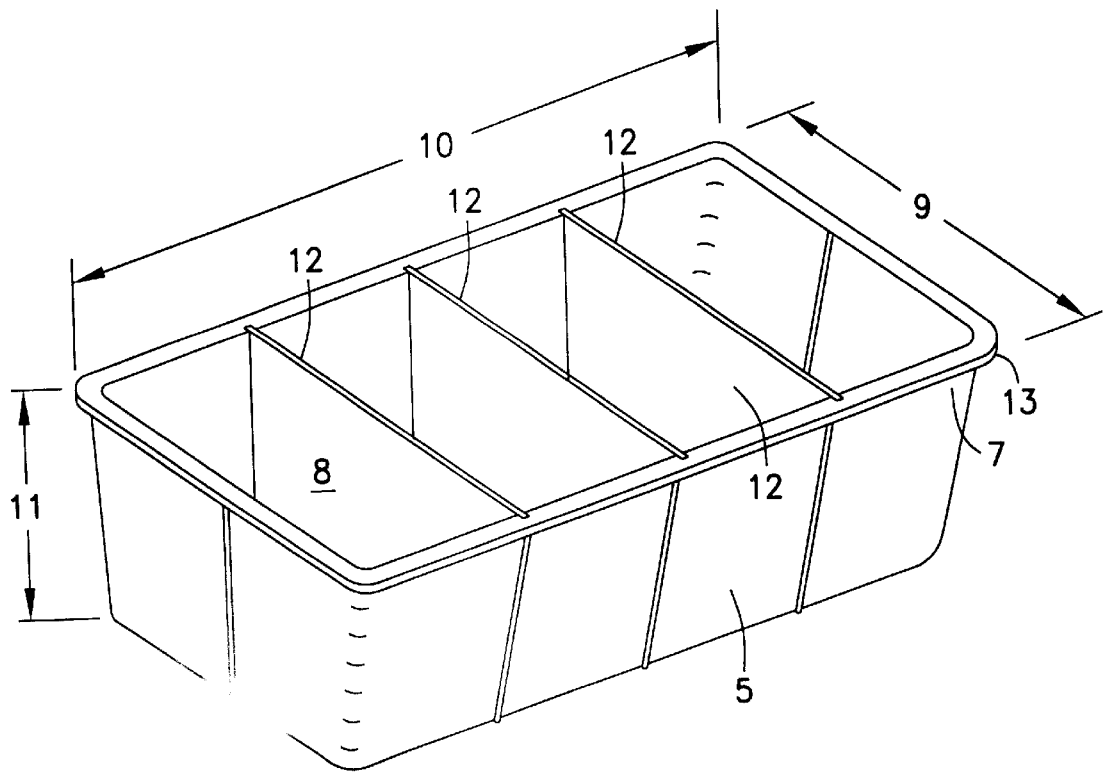
FIG. 2 shows a storage bin constructed in accordance with the invention.
Figure 3:
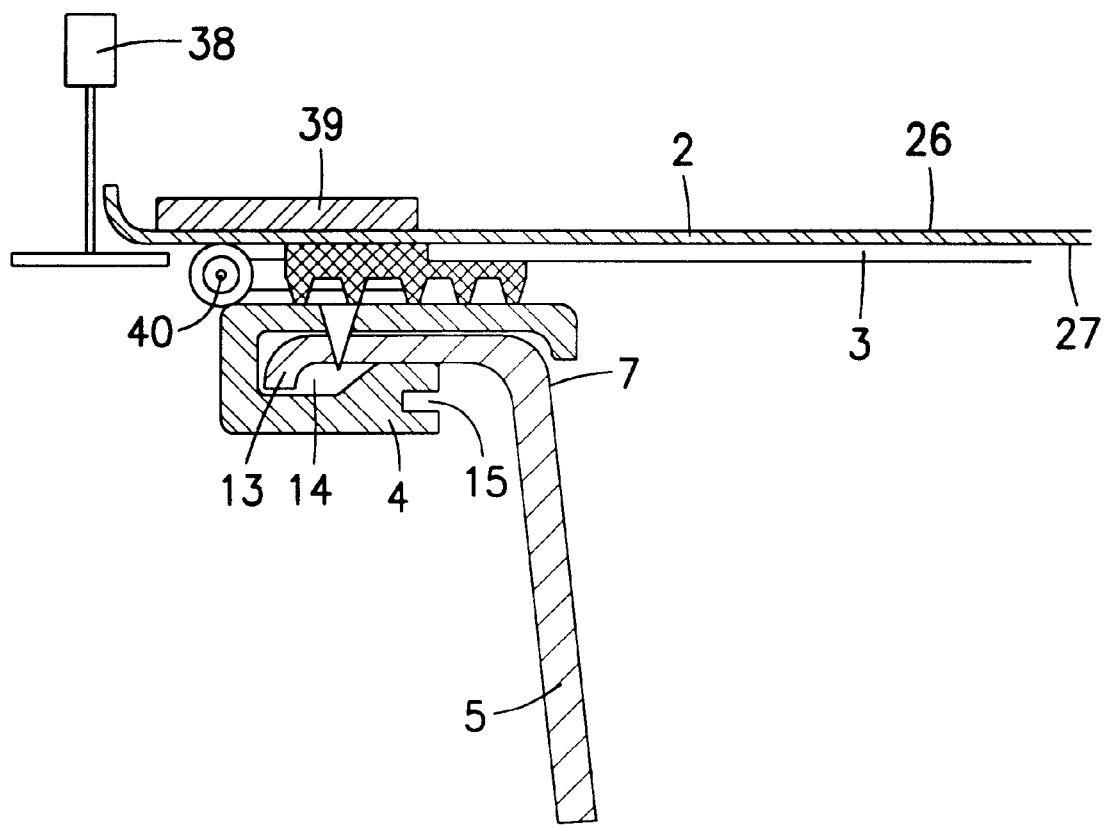
FIG. 3 is a cross-sectional end view taken along line A—A of FIG. 1.

FIG. 1 shows an exploded view of one embodiment of a storage system 1 constructed in accordance with the invention comprising a pan 2, a liner 3, a reinforcing ring 4, and a storage container or bin 5. The storage container or bin 5 has a closed bottom end 6 and an open top end 7 defining a storage compartment 8. The bin 5 may be manufactured from a variety of strong yet lightweight materials well known to those skilled in the art as suitable for this purpose, however, in a preferred embodiment vacuum formed styrene is utilized. The bin 5 may be shaped and sized as specific applications dictate, however, in an especially preferred embodiment, shown in FIG. 2, a bin having a width 9 of about 23.5 inches, a length 10 of about 47.5 inches, and a depth 11 of about 16 inches is utilized. The bin 5 may also be provided with removable or permanent dividers 12 to accommodate specific storage needs as shown in FIG. 2. The bin 5 may also be provided with an external decorative or ornamental treatment such as paint, decals, or textured surfaces (not shown). As shown in FIGS. 1, 2, and 3, the bin 5 is provided with a reinforcing ring engagement lip 13 that projects from the open top end 7 of the storage bin 5.

Figure 4:
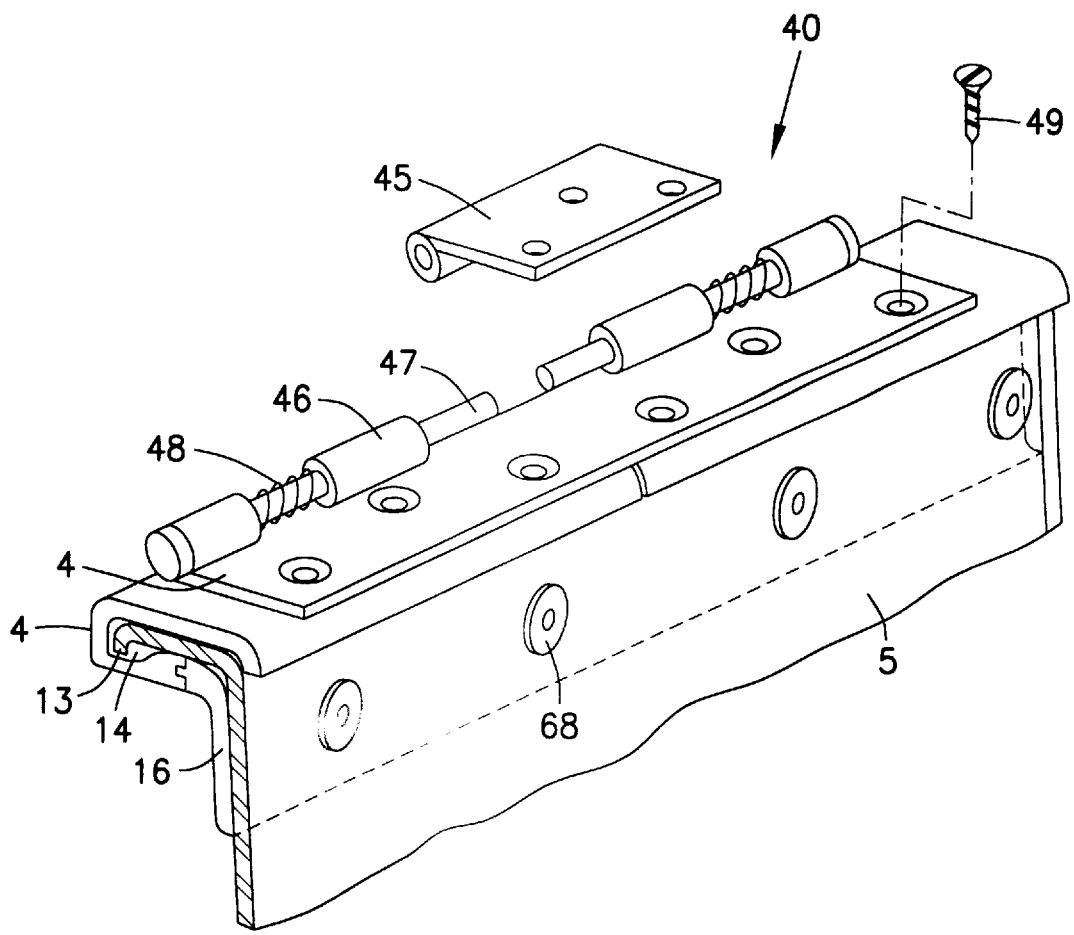
FIG. 4 is a detailed view of a hinge assembly and its method of attachment.
Figure 6:
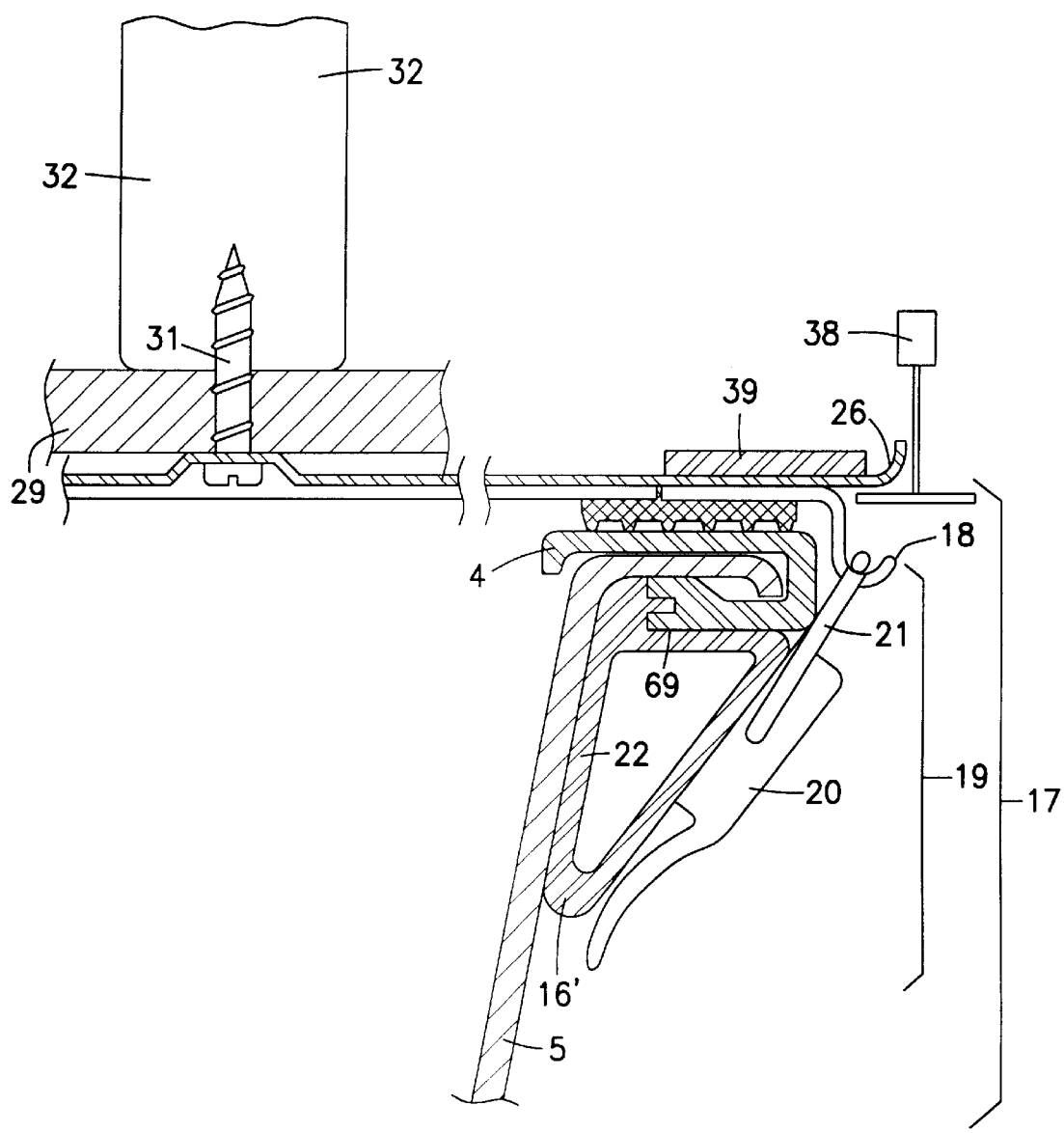
FIG. 6 is a cross-sectional end view taken through a draw-latch type latch assembly attached to the storage system.
Figure 13:
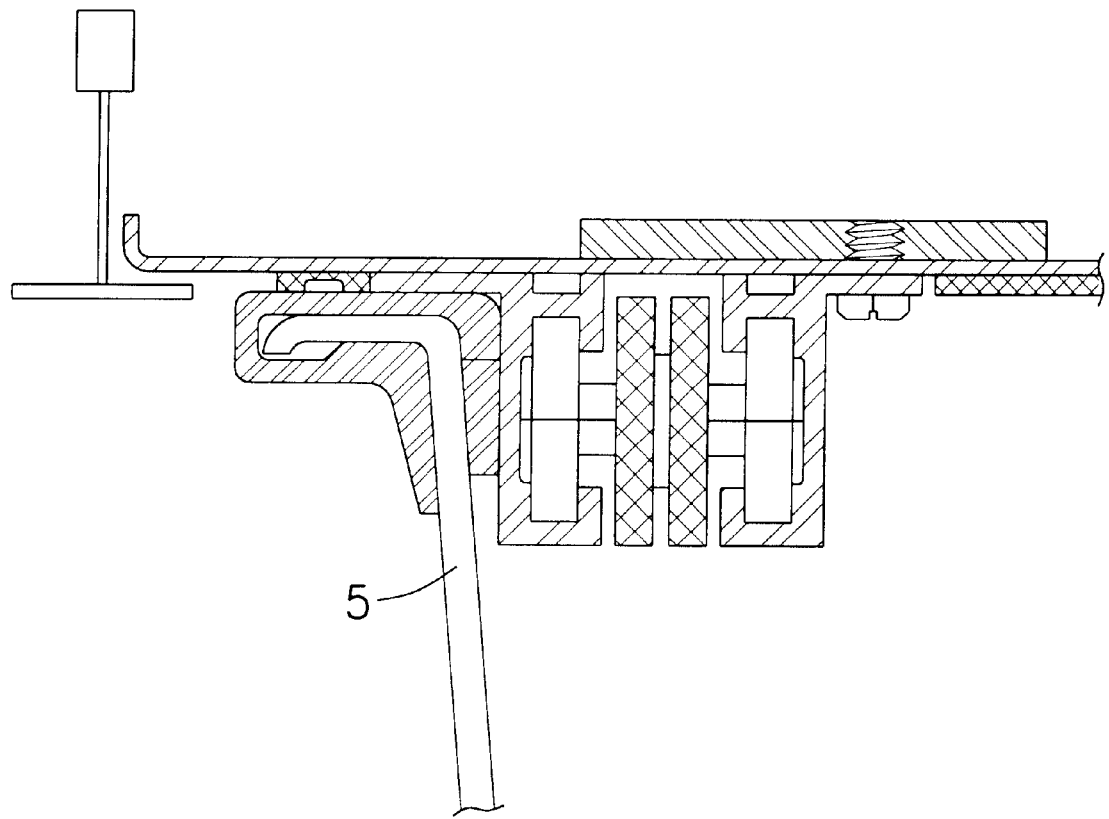
FIG. 13 is a cross-sectional end view taken along line A—A of FIG. 12.
Figure 14:
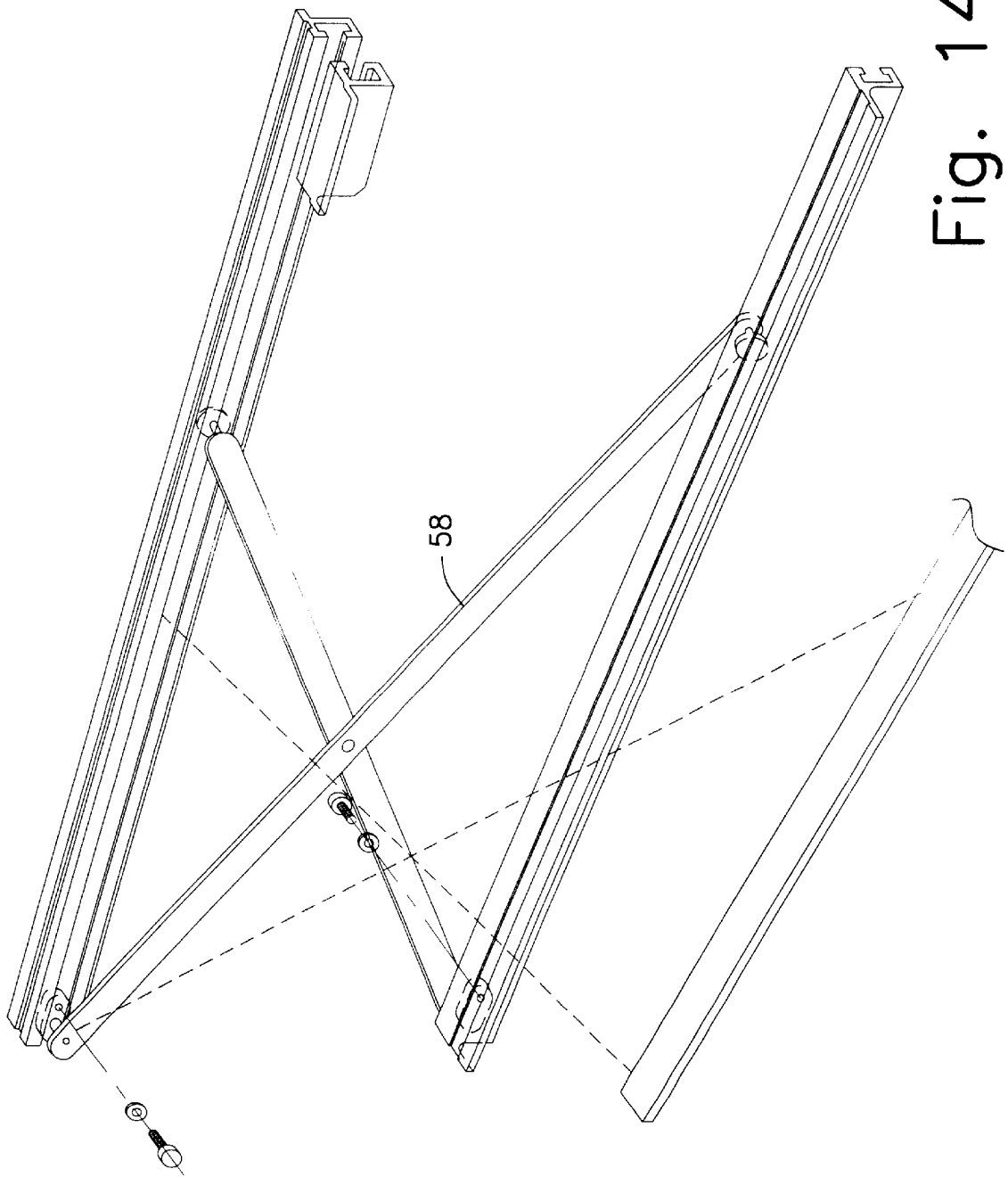
FIG. 14 is a detailed side view of the scissor mechanism shown in FIGS. 11–13.

FIGS. 1 and 3 show a reinforcing ring 4 having a first channel 14 and a second channel 15. The first channel 14 is sized and adapted to receive and retain the reinforcing ring engagement lip 13 that projects from the top end 7 of the storage bin 5. The second channel 15 is sized and adapted to engage and retain a reinforcing ring securing member 16 as shown in FIG. 4. The reinforcing ring securing member 16 may be substantially solid as shown in FIGS. 4 and 13 or may be tubular. In an especially preferred embodiment the reinforcing ring securing member 16 is tubular and has a substantially triangular configuration when viewed in cross-section as shown in FIGS. 6 and 6B. This tubular and substantially triangular configuration results in a stronger and more rigid reinforcing ring securing member 16' shown in FIGS. 6 and 6B that is lightweight, imparts greater strength and rigidity to the bin 5, and also provides an additional support surface 69 which provides additional support to the reinforcing ring 4. The reinforcing ring securing member 16 and 16' secures the reinforcing ring 4 to the bin 5 and secures the reinforcing ring engagement lip 13 in the first channel 14 of the reinforcing ring 4. The reinforcing ring 4 and the reinforcing ring securing member 16 and 16' may be made of a wide variety of materials well known to those skilled in the art as suitable for this purpose, however in a preferred embodiment metal is utilized, and in an especially preferred embodiment aluminum is utilized. The reinforcing ring securing member 16 and 16' can be attached to the bin 5 using a wide variety of means well known to those skilled in the art as suitable for this purpose, e.g., screws, bolts, rivets, adhesives, and welding, however, in a preferred embodiment a plurality of pop-rivets 68 as shown in FIGS. 4 and 6B is utilized.

FIGS. 6 and 6B show two embodiments of a latch means assembly having a first portion communicating with the pan portion and a second portion communicating with the storage bin for selectively securing the storage bin in the closed first position 42.

Figure 6A:
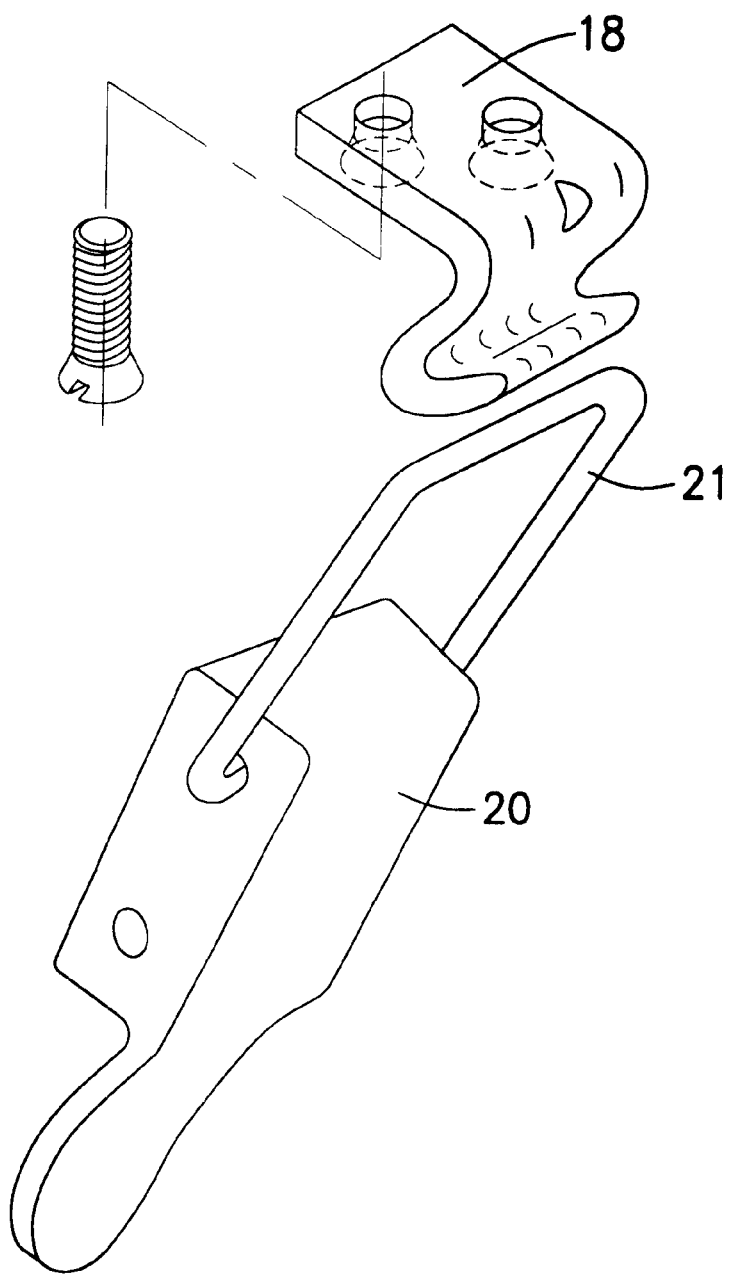
FIG. 6A is an exploded view of a portion of the draw-latch assembly shown in FIG. 6.
Figure 6B:
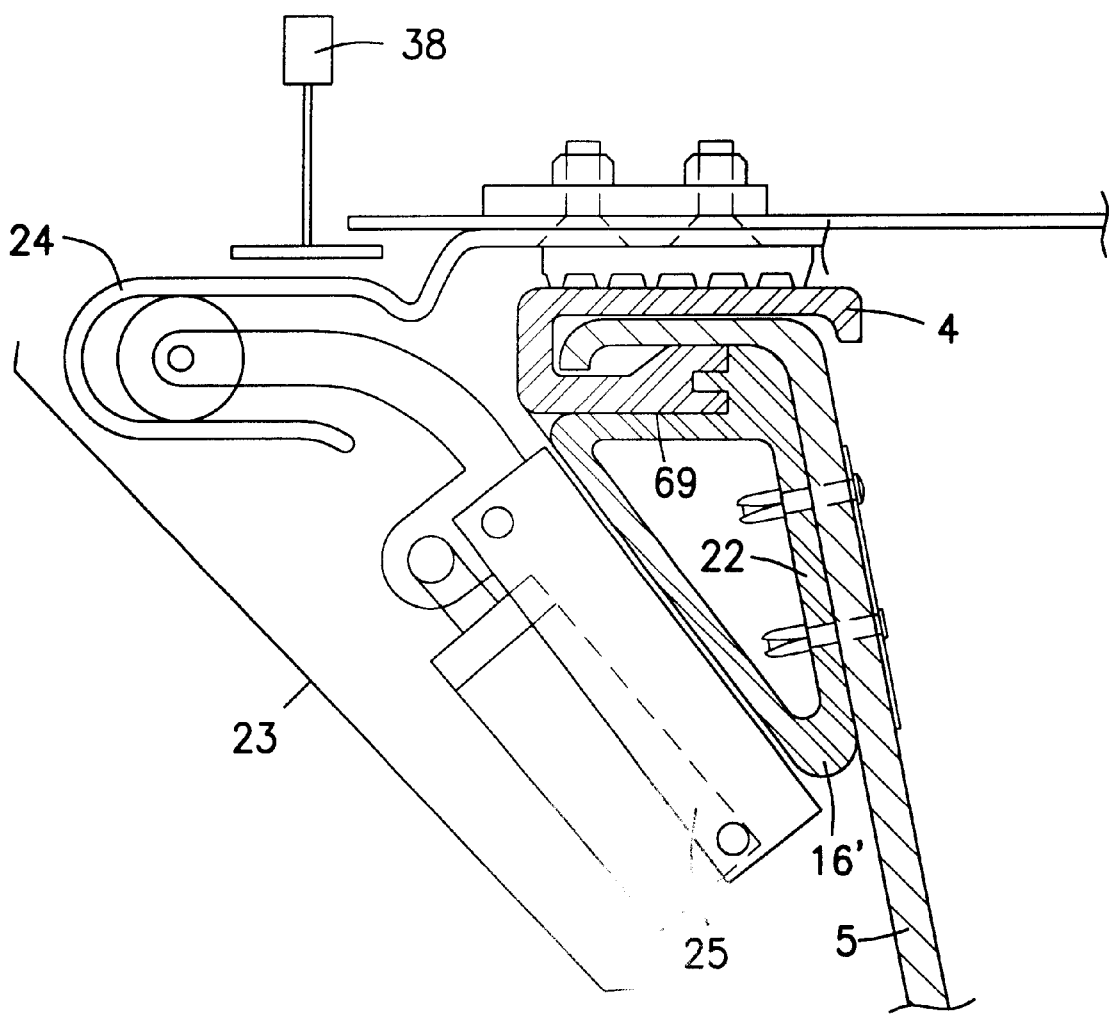
FIG. 6B shows a touch-latch-type latch assembly constructed in accordance with the invention.

FIGS. 6 and 6A show a draw-latch type latch means assembly 17 comprising a first draw-latch hook portion 18 and second portion 19. The second portion 19 comprises a draw-latch portion 20, an engagement loop 21, and a draw-latch blocking portion 22 cooperatively disposed to permit the engagement loop 21 to selectively engage the draw-latch hook 18 to permit the bin 5 to be selectively secured when it has been moved to the first or closed position 42. In another preferred embodiment shown in FIG. 6B, the latch means assembly comprises a "touch-latch" type latch assembly 23, i.e., the type of latch that can be unlatched by simply moving or pushing the bin slightly in the first direction 41 towards the pan portion 2. In an especially preferred embodiment, a hydro-pneumatic roller type touch-latch is utilized. The touch-latch 23 is comprised of a first portion 24 communicating with the pan plate assembly 2 and a second portion 25 communicating with the storage bin 5.

The first portion 18 and 24 of the latch means assembly 17 and 23 may be attached directly to the pan assembly 2 and the second portion 19 and 25 of the latch means assembly 17 and 17' is attached directly to the storage bin 5. In a preferred embodiment the second portion 19 and 25 of the latch means assembly 17 and 23 is attached to storage bin 5 via the securing ring 4. In another preferred embodiment the second portion 19 and 25 of the latch means assembly 17 and 23 is attached to storage bin 5 via the reinforcing ring securing member 16 and 16'. In an especially preferred embodiment the second portion 19 and 25 of the latch means assembly 17 and 23 is attached to storage bin 5 via both the securing ring 4 and the reinforcing ring securing member 16 and 16' to impart additional strength and rigidity to the system. In an alternative embodiment, the second portion 19 and 25 of the latch means assembly 17 and 23 is formed integral with the reinforcing ring 4.

Figure 6C:
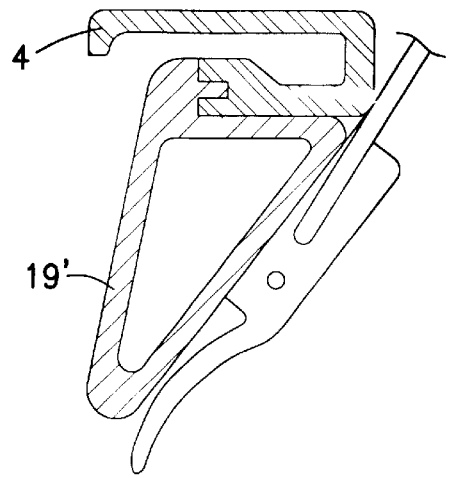
FIG. 6C shows an alternative embodiment of a second portion of a draw-latch type latch assembly utilized in accordance with the invention.
Figure 6D:
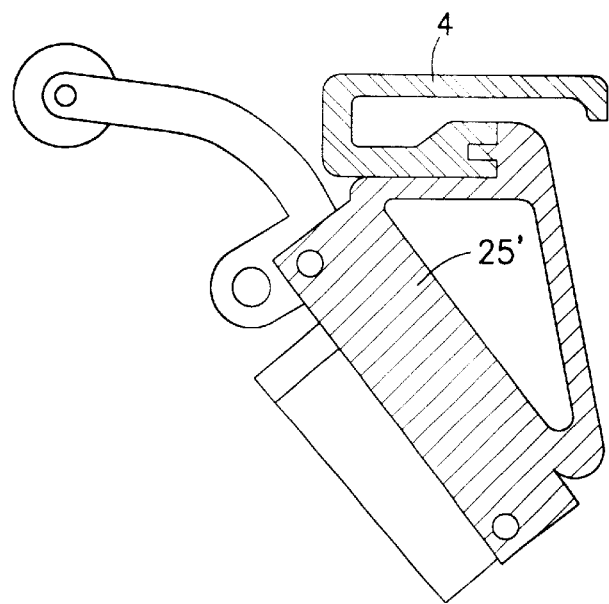
FIG. 6D shows an alternative embodiment of a second portion of a touch-latch type latch assembly-utilized in accordance with the invention.

In an especially preferred embodiment, shown in FIGS. 6C and 6D, the second portion 19' and 25' of the latch means assembly 17 and 23 is sized and adapted to be retained in the second channel 15 of the reinforcing ring 4. As shown in FIGS. 6C and 6D, the second channel 15 is also sized and adapted to engage and retain the second portion 19' and 25' of a latch means having a first portion and a second portion.

The second portions 19, 19', 25 and 25' are preferably shaped to match the shape of the reinforcing ring 4 in order to present a smooth and attractive external appearance. The interlocking of the reinforcing ring 4, the reinforcing ring securing member 16 and 16', and the second portion 19, 19', 25, and 25' of the latch assembly 17 and 23 imparts additional strength and rigidity to the assembly.

FIGS. 1 and 3 show a liner 3 disposed on the second major surface 27 of the pan assembly 2. The liner 3 is both decorative and helps to seal the contents of the storage bin 5 from dust and debris. The liner 3 may be attached to the pan portion 2 in a variety of ways, e.g., glue or double sided tape, however, in a preferred embodiment a velcro® type fastener is utilized.

Figure 7:
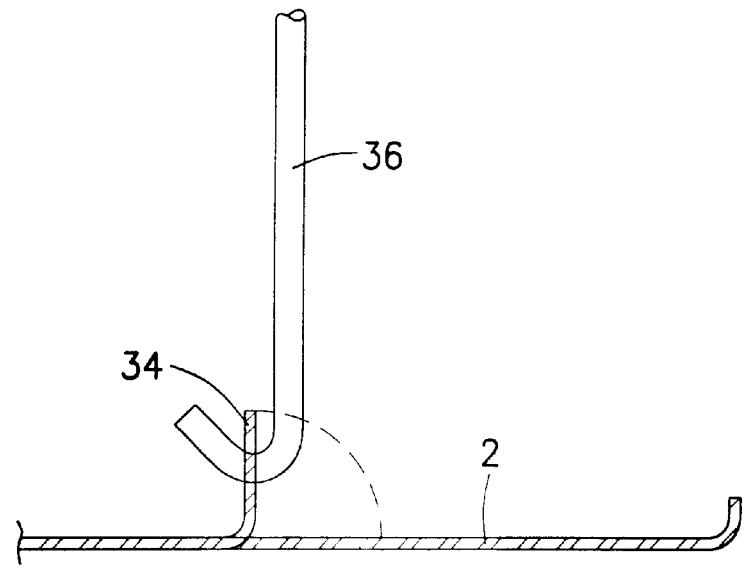
FIG. 7 shows an embodiment of the invention in which the device is suspended from a pencil rod.
Figure 8:
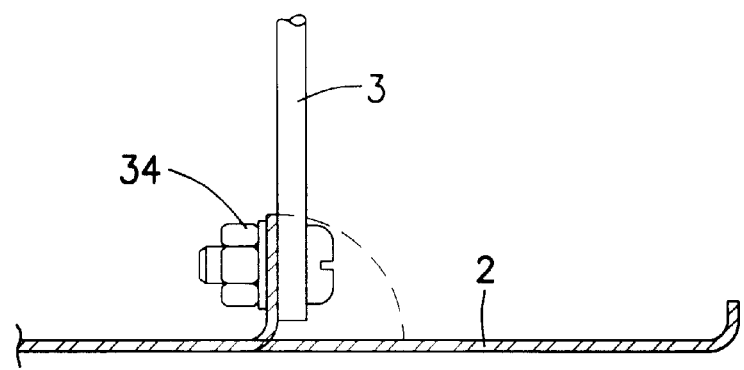
FIG. 8 shows an embodiment of the invention in which the device is suspended from a flat bar.

The pan portion 2 shown in FIGS. 1, 3, and 6 has a first major surface 26 and a second major surface 27 and is provided with means for securing the pan portion 2 to the ceiling 29. In a preferred embodiment the means for securing the pan portion 2 comprises a plurality of apertures 30 disposed in the pan portion through which screws 31 can be inserted and secured to the ceiling rafters 32 as shown in FIG. 6. For many applications these apertures 30 are preferably spaced 16" and 24" apart to conform to standard center-to-center spacing of most ceiling beams. The pan portion 2 may also be provided with slotted apertures 33, as shown in FIG. 1, to facilitate and provide greater flexibility in installation. In an especially preferred embodiment the pan portion 2 is also provided with a plurality of selectively moveable pan tabs 34 each of which is provided with a pan tab engagement aperture 35. The pan tabs 34 provide greater flexibility of installation and are especially useful when used to attach the pan 2 to ceiling systems having conventional "pencil rods" 36 as shown in FIG. 7 or "flat bars" 37 as shown in FIG. 8. Alternatively, the pan 2 may be suspended from a "T-Bar" 38 of a suspended ceiling as shown in FIGS. 3 and 6. A reinforcing plate 39 is disposed on the first major surface 26 of the pan portion 2, as shown in FIGS. 3 and 6, to provide the pan portion 2 with additional strength and rigidity.

Figure 5:
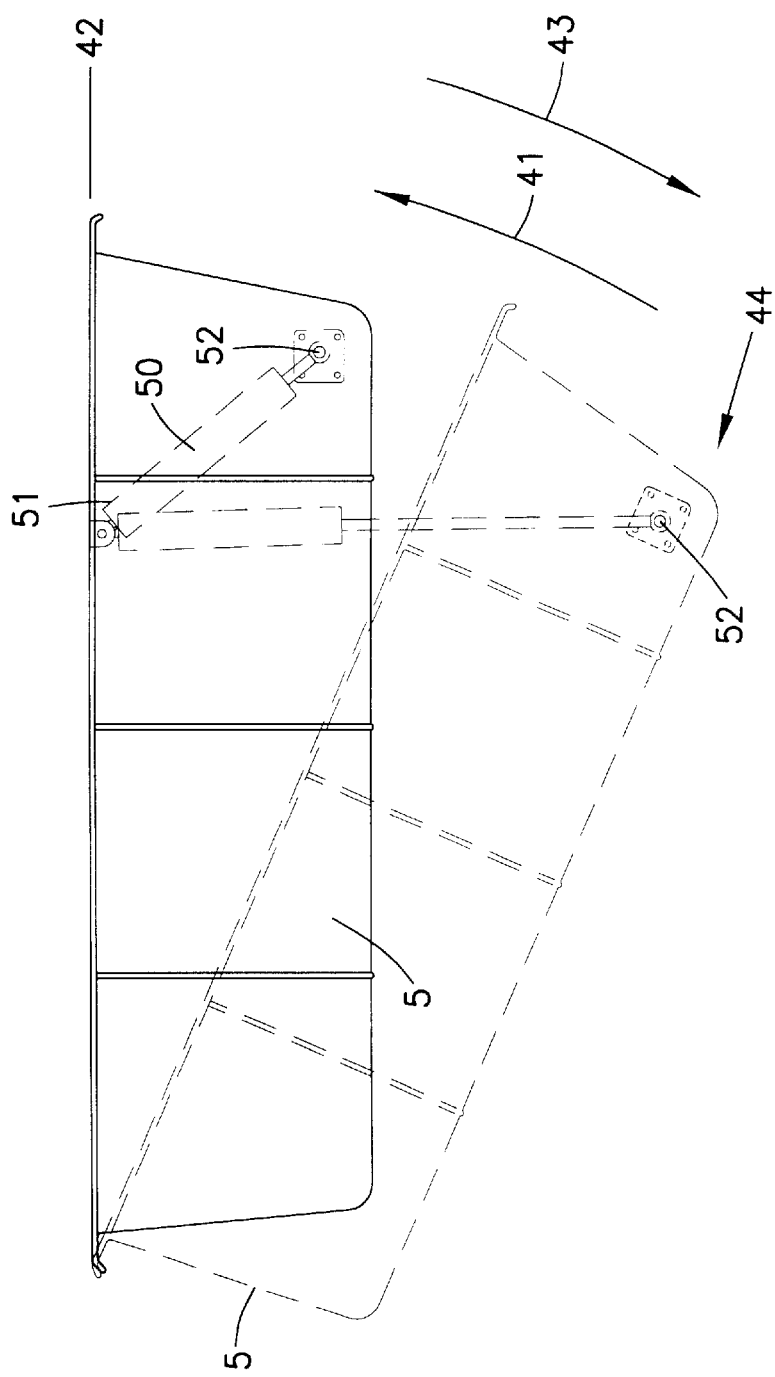
FIG. 5 is a side view of a storage bin shown disposed in a first closed position and shown in phantom disposed in a second open position.

A means 40 is provided for hingedly connecting the pan 2 portion to the storage bin 5 as shown in FIG. 4. The means for hingedly connecting 40 permits the storage bin 5 to be selectively moved in a first direction 41 towards the pan portion 2 to a first closed position 42 and in a second direction 43 away from the pan portion 2 to a second open position 44 as shown in FIG. 5. In a preferred embodiment a conventional hinge 40 having a first portion 45, a second portion 46, and a pin portion 47 is utilized. In an especially preferred embodiment a spring 48 loaded hinge is utilized as shown in FIG. 4. The hinge 40 may be attached in a variety of ways well known to those skilled in the art as suitable for this purpose, e.g., by using bolts, screws, rivets, adhesives, or welding, however, in a preferred embodiment a plurality of sheet metal screws 49, as shown in FIG. 4, is utilized.

Figure 9:
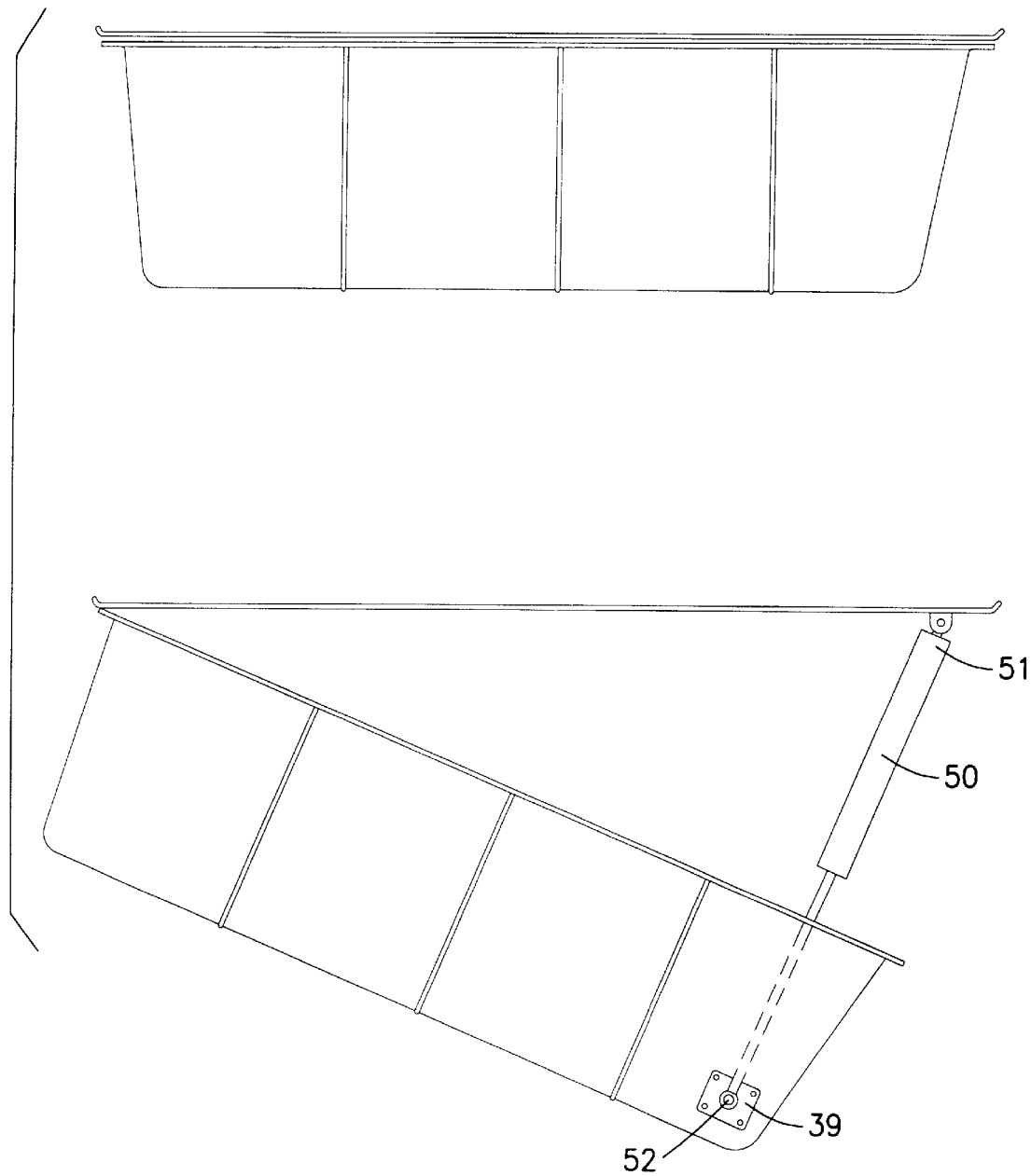
FIG. 9 shows an embodiment of the invention that utilizes a gas spring cylinder.
Figure 10:
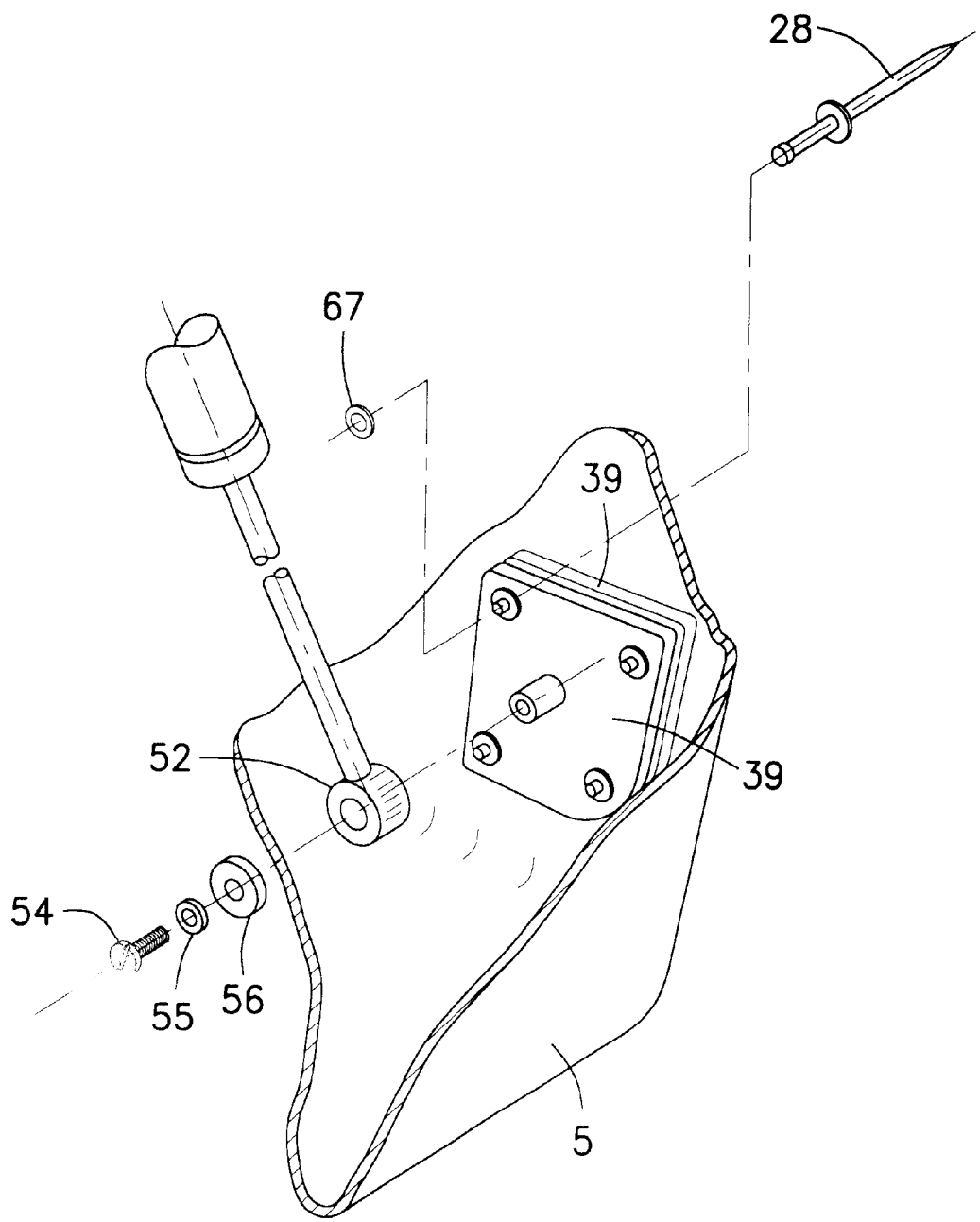
FIG. 10 shows details of a preferred embodiment for securing the gas spring cylinder shown in FIG. 9 to the storage bin.
Figure 11:
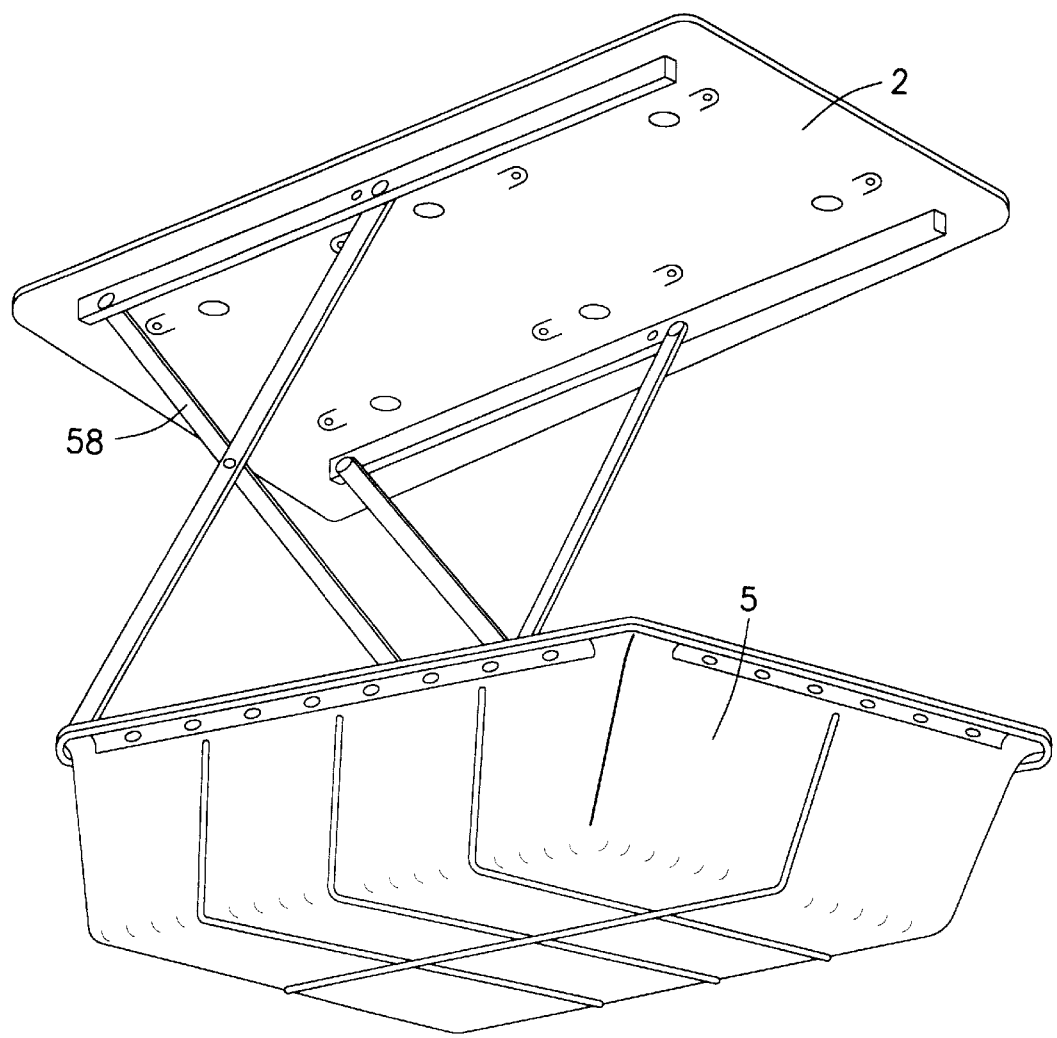
FIG. 11 shows an alternative embodiment of the invention that utilizes a scissor hinge.
Figure 12:
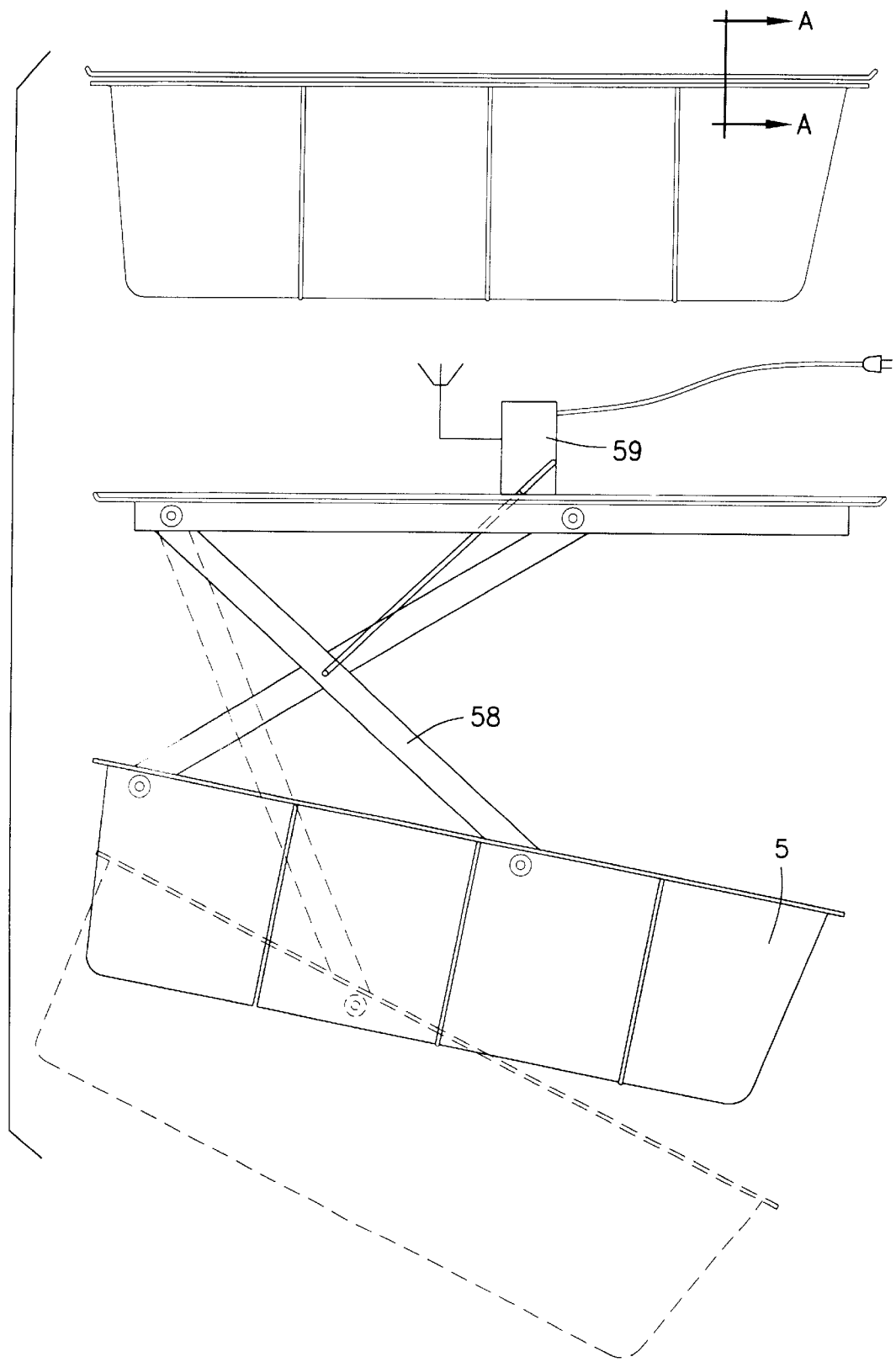
FIG. 12 is a side view of the embodiment shown in FIG. 11.

In an especially preferred embodiment a means 50 is provided for controlling the rate at which the storage bin 5 moves from the first position 42 to the second position 44. A wide variety of means for controlling the movement from the first position to the second position well known to those skilled in the art as suitable for this purpose may be utilized, however, in a preferred embodiment, as shown in FIGS. 5 and 9, at least one gas spring cylinder 50 having a first end 51 attached to the pan portion 2 and a second end 52 attached to the storage bin 5 is utilized. In a preferred embodiment, the second end 52 of the gas spring cylinder 50 is attached to the bin 5 via a reinforcing plate 53, retaining screw 54, split washer 55, and flat washer 56 and the reinforcing plate 53 is attached to the bin 5 using a pop-rivet 28 and pop-rivet washer 67 as shown in FIG. 10. In an especially preferred embodiment the gas spring cylinder 50 is motorized 57 and is adapted to be remotely controlled, e.g., by use of a wall switch or with a high frequency signal that is used to selectively energize the motor.

FIGS. 11–14 show an alternative embodiment of the invention is which the means for hingedly connecting the pan assembly to the storage bin is a scissor hinge 58. This type of hinge permits the storage bin 5 to be moved from the first position 42 to the second position 44 while keeping the bin substantially parallel to the ceiling. This embodiment is especially preferred where fluids are stored. The scissor hinge 58 may be motorized 59 and be adapted for remote control as previously discussed.

Figure 15:
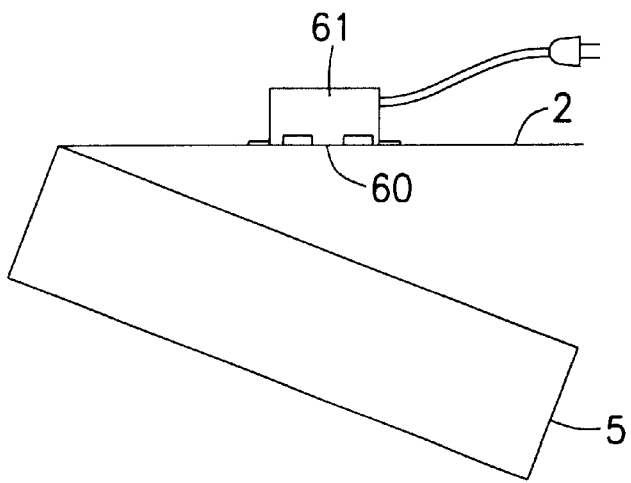
FIG. 15 shows a duplex plate mounted on the pan portion.
Figure 15A:
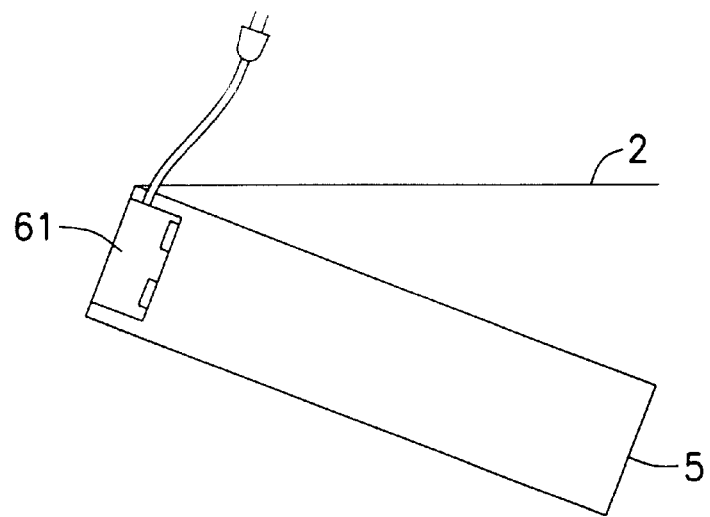
FIG. 15A shows a duplex plate mounted within the storage bin.

The storage bin 5 may also be modified to store electrical components such as stereo equipment or VCR's. In a preferred embodiment, the storage bin 5 is used to house computer components, e.g., the central processing unit ("CPU"). In an especially preferred embodiment the interaction, communication, and control between the electrical components disposed inside the storage bin and the related components disposed outside of the bin, e.g., screen, on/off switch, disc drive, CD/ROM drive, and printers will utilize laser technology. In this application the bin may be provided with electrical transmission means to permit electricity to be transmitted to and from the electrical component housed in the storage bin. The electrical transmission means may be, e.g., an aperture or a plurality of apertures disposed in the storage bin or the pan portion to receive and act as a conduit for electrical cables and related wiring. Alternatively, the bin may be provided with electrical interlocks that are disposed and adapted to interlock and close a circuit when the bin is in the first or closed position. In a preferred embodiment, the pan portion 2 is provided with a duplex plate 60 adapted to receive and mount a duplex electrical plug 61 as shown in FIG. 15. In another preferred alternative embodiment the duplex electrical plug 61 is mounted within the storage compartment 8 of the storage bin 5 as shown in FIG. 15A.

Figure 16:
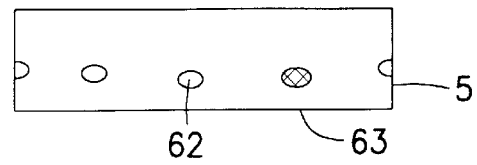
FIG. 16 shows a plurality of portals disposed in the storage bin.

In an especially preferred embodiment, the storage bin 5 is also provided with a means for transmitting signals between an electrical component disposed within the storage bin 5 and an electrical component disposed outside the storage bin 5. This means for transmitting signals may be one or more portals or apertures 62 disposed in the storage bin as shown in FIG. 16. The portals or apertures 62 may be made by molding the bin with a plurality of apertures or by removing material from the storage bin after it has been made. Alternatively, the means for transmitting signals may comprise one or more windows 63 disposed in the bin 5 comprised of a material such as glass or clear plastic that permits a signal, e.g. an infrared signal, from a stereo remote control or between a computer and a printer to pass through it. In another preferred embodiment, the entire bin is constructed from a material that will permit a signal such as an infrared signal to pass through it.

Figure 17:
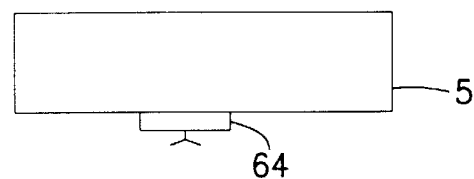
FIG. 17 shows a means for transmitting signals attached to the storage bin.

Alternatively, the bin may be provided with an externally mounted means, e.g., an antenna 64, for receiving and/or transmitting signals between an electrical component disposed within the storage bin and an electrical component disposed outside the storage bin that is adapted to receive and transmit signals from a variety of angles and positions in a room as shown in FIG. 17. In a preferred embodiment the externally mounted means for receiving and transmitting signals 64 utilizes high frequency transmissions.

Figure 18:
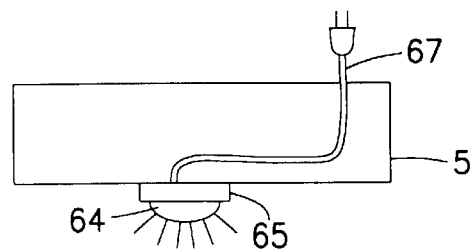
FIG. 18 shows a means for mounting an electrical device to the external surface of the storage bin.

The storage bin may be provided with a means 65 for mounting an appliance 66, e.g., a smoke detector, a fan, or a light, and may also be provided with a means 67 for providing electricity to the appliance 66 as shown in FIG. 18.

What is claimed is:
1. A ceiling mounted storage device, comprising:
   a. a storage bin having a closed bottom end and an open top end defining a storage compartment, the bin comprised of styrene;
   b. a reinforcing ring engagement lip projecting from said first top end of said storage bin;
   c. a reinforcing ring having a first channel and a second channel, said first channel sized and adapted to engage and retain said engagement lip, said second channel sized and adapted to engage and retain a reinforcing ring securing member, said second channel also sized and adapted to engage and retain the second portion of a latch assembly;
   d. a pan portion having a first major surface and a second major surface, said pan portion provided with means for securing said pan portion to said ceiling;
   e. a reinforcing plate disposed on said first major surface of said pan portion;
   f. means for hingedly connecting said pan portion to said storage bin to permit said storage bin to be selectively moveable in a first direction towards said pan portion to a first closed position and moveable in a second direction away from said pan portion to a second open position;
   g. a reinforcing ring securing member for securing said reinforcing ring to said reinforcing engagement lip, said reinforcing ring securing member having a first end sized and adapted to be disposed within and secured within said second channel of said reinforcing ring, said second end of said reinforcing ring securing member provided with means for attaching said reinforcing ring securing member to said storage bin; and h. a latch assembly comprising a first portion and a second portion, said first portion communicating with said pan assembly, said second portion communicating with said storage bin, said first portion and said second portion cooperatively disposed for selective engagement with each other to permit said storage bin to be selectively secured in said first position.

2. The device of claim 1, further comprising dividers.

3. The device of claim 2, wherein the dividers are removable.

4. The device of claim 2, wherein the dividers are permanent.

5. The device of claim 1, wherein the bin has a width of about 23.5 inches, a length of about 47.5 inches, and a depth of about 16 inches.

6. The device of claim 1, further comprising an external decorative or ornamental treatment provided on the external surface of the bin.

7. The device of claim 6, wherein the treatment is paint.

8. The device of claim 6, wherein the treatment is a decal.

9. The device of claim 6, wherein the treatment is a textured surface.

* * * * *